(12) United States Patent
Hyun (10) Patent No.: US 12,399,623 B2
(45) Date of Patent: Aug. 26, 2025

(54) MEMORY MODULE AND METHOD OF OPERATING THE SAME

(71) Applicant: SK hynix Inc., Icheon-si (KR)

(72) Inventor: Sung Woo Hyun, Icheon-si (KR)

(73) Assignee: SK HYNIX INC., Icheon-si (KR)

( * ) Notice: Subject to any disclaimer, the term of this patent is extended or adjusted under 35 U.S.C. 154(b) by 0 days.

(21) Appl. No.: 18/449,903

(22) Filed: Aug. 15, 2023

(65) Prior Publication Data

US 2024/0272800 A1   Aug. 15, 2024

(30) Foreign Application Priority Data

Feb. 9, 2023   (KR) .......................... 10-2023-0017401

(51) Int. Cl.
G06F 3/06 (2006.01)

(52) U.S. Cl.
CPC .......... *G06F 3/0613* (2013.01); *G06F 3/0659* (2013.01); *G06F 3/0673* (2013.01)

(58) Field of Classification Search
CPC ..... G06F 3/0613; G06F 3/0659; G06F 3/0673
See application file for complete search history.

(56) References Cited

U.S. PATENT DOCUMENTS

| | | | | |
|---|---|---|---|---|
| 2007/0294468 A1* | 12/2007 | Olbrich | ................ | G11C 7/1015 711/103 |
| 2010/0157644 A1* | 6/2010 | Norman | ................... | G11C 7/10 365/219 |
| 2011/0196648 A1 | 8/2011 | Mayer et al. | | |
| 2018/0203643 A1* | 7/2018 | Pedersen | ................ | G11C 5/148 |
| 2020/0026465 A1* | 1/2020 | Jung | ................... | G06F 12/0246 |
| 2020/0326874 A1* | 10/2020 | Lai | ........................ | G06F 3/0647 |
| 2024/0111454 A1* | 4/2024 | Hinkle | .................. | G06F 3/0607 |

FOREIGN PATENT DOCUMENTS

| KR | 950004949 B1 | 5/1995 |
|---|---|---|
| KR | 20050083063 A | 8/2005 |
| KR | 20200054402 A | 5/2020 |

OTHER PUBLICATIONS

Castellana, Vito Giovanni, Antonino Tumeo, and Fabrizio Ferrandi. "An adaptive memory interface controller for improving bandwidth utilization of hybrid and reconfigurable systems." 2014 Design, Automation & Test in Europe Conference & Exhibition (Date). IEEE, 2014. (Year: 2014).*
Seshadri, Vivek, et al. "RowClone: Accelerating data movement and initialization using DRAM." arXiv preprint arXiv:1805.03502 (2018). (Year: 2018).*

* cited by examiner

*Primary Examiner* — Nicholas J Simonetti
(74) *Attorney, Agent, or Firm* — Perkins Coie LLP (57) ABSTRACT

The disclosed technology relates to an electronic device with a memory module. In some implementations, a memory module may include a memory device and a memory controller. The memory device may store data. The memory controller may communicate with an external device through a first interface and the memory device through a second interface, and set a type of the second interface as a parallel interface or a serial interface according to a ratio between a first request and a second request received from the external device.

19 Claims, 10 Drawing Sheets

Parallel Interface

Serial Interface

MEMORY MODULE AND METHOD OF OPERATING THE SAME

CROSS-REFERENCE TO RELATED APPLICATION

This patent document claims priority to and benefits of the Korean patent application number 10-2023-0017401, filed on Feb. 9, 2023, which is incorporated herein by reference in its entirety.

TECHNICAL FIELD

The disclosed technology relates to a memory module, and more particularly, to a memory module and a method of operating the same.

BACKGROUND

A memory module is a printed circuit board on which memory devices are mounted to store data that a host device such as a computer or a smartphone can read. The memory module may include one or more memory controllers, in addition to the memory devices, to control the operations of the memory devices, and memory interface. The memory devices may be classified into volatile memory devices and nonvolatile memory devices.

Volatile memory devices can retain data only while the power is on. Examples of the volatile memory devices include a static random access memory (SRAM) and a dynamic random access memory (DRAM).

Nonvolatile memory devices can retain data even when the power is turned off. Examples of the nonvolatile memory device include a read only memory (ROM), a programmable ROM (PROM), an electrically programmable ROM (EPROM), an electrically erasable and programmable ROM (EEPROM), and a flash memory.

SUMMARY

The disclosed technology can be implemented in some embodiments to provide a memory module and a method of operating the memory module to efficiently perform data transmission by dynamically setting a memory interface according to a ratio between a read request and a write request received from a host.

In an embodiment of the disclosed technology, a memory module may include a memory device and a memory controller. The memory device may store data. The memory controller may communicate with an external device through a first interface and the memory device through a second interface, and set a type of the second interface as a parallel interface or a serial interface according to a ratio between a first request and a second request received from the external device.

In an embodiment of the disclosed technology, a method of operating a memory module may include receiving a first request or a second request from an external device; and setting a type of a memory interface configured to interface a memory device with a memory controller in the memory module as a parallel interface or a serial interface according to a ratio between a first request and a second request received from the external device.

In an embodiment of the disclosed technology, a method of operating a memory module may include selecting one of a first condition and a second condition based on a ratio between a read request and a write request received from an external device; setting a type of a memory interface configured to interface a memory device with a memory controller in the memory module as a parallel interface upon selecting the first condition; and setting the type of the memory interface as a serial interface upon selecting the second condition.

In an embodiment of the disclosed technology, a memory module may include a memory device that stores data; and a memory controller configured to be communicatively connected to an external device outside the memory module through a first interface and configured to be communicatively connected to the memory device through a second interface, the memory controller configured to set a type of the second interface as a parallel interface or a serial interface according to a ratio between a first request and a second request received from the external device through the first interface.

In an embodiment of the disclosed technology, a method of operating a memory module may include receiving a first request or a second request from an external device to perform an operation on a memory device in the memory module; and setting a type of a memory interface configured to interface the memory device with a memory controller in the memory module as a parallel interface or a serial interface according to a ratio between a first request and a second request received from the external device.

In an embodiment of the disclosed technology, a method of operating a memory module may include selecting one of a first condition and a second condition based on a ratio between a read request and a write request received from an external device to perform an operation on a memory device in the memory module; setting a type of a memory interface configured to interface a memory device with a memory controller in the memory module as a parallel interface upon selecting the first condition; and setting the type of the memory interface as a serial interface upon selecting the second condition.

In an embodiment of the disclosed technology, a memory module may include a memory device and a memory controller. The memory controller may set a second interface communicating with the memory device as any one interface of a parallel interface and a serial interface according to a ratio between a first request and a second request received from an external device through a first interface.

In an embodiment of the disclosed technology, a method of operating a memory module may include receiving a first request or a second request from an external device, and setting a memory interface communicating with a memory device as any one interface of a parallel interface and a serial interface according to a ratio between a first request and a second request received from the external device.

In an embodiment of the disclosed technology, a method of operating a memory module may include selecting any one condition of a first condition and a second condition based on a ratio between a read request and a write request received from an external device, setting a memory interface communicating with a memory device as a parallel interface in response to the first condition, and setting the memory interface as a serial interface in response to the second condition.

In some embodiments of the disclosed technology, a memory module and a method of operating the same efficiently performing data transmission by dynamically setting a memory interface according to a ratio of a read request and a write request received from a host are provided.

DETAILED DESCRIPTION

Specific structural features or functions for certain embodiments disclosed in this patent document are examples only to illustrate certain implementations of the disclosed technology.

The disclosed technology can be implemented in some embodiments to efficiently perform data transmission by dynamically setting a memory interface according to a ratio of a read request and a write request received from a host.

Figure 1:
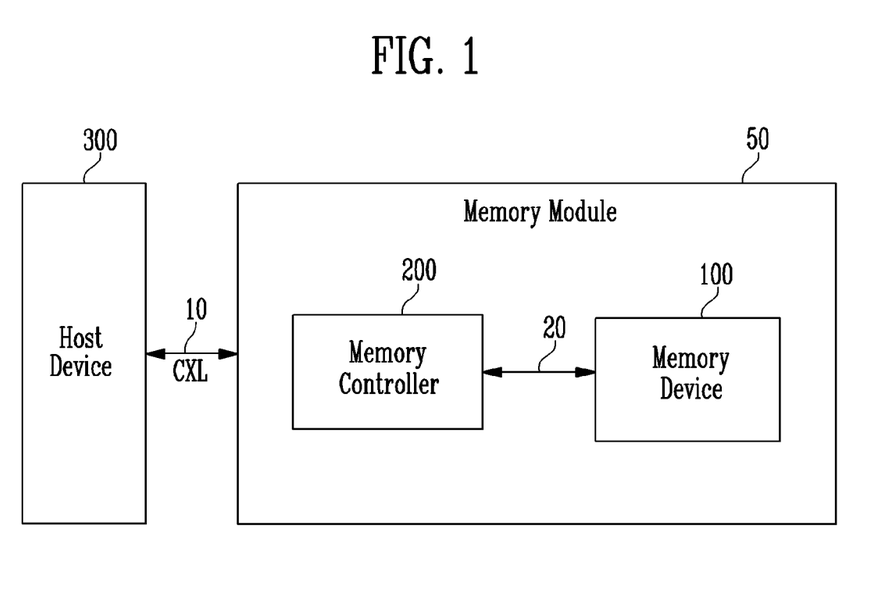
FIG. 1 is a diagram illustrating an example of a memory module and an example of a host device based on some embodiments of the disclosed technology.

FIG. 1 is a diagram illustrating an example of a memory module and an example of a host device based on some embodiments of the disclosed technology.

Referring to FIG. 1, in some implementations, a memory module 50 may include a memory device 100 and a memory controller 200 that is in communication with the memory device 100 to control an operation of the memory device 100. The memory module 50 stores data under control of a host device 300 such as a cellular phone, a smartphone, an MP3 player, a laptop computer, a desktop computer, a game player, a TV, a tablet PC, or an in-vehicle infotainment system. In some implementations, upon request from the host device 300, the memory module 50 stores data received from the host device 300 or provides the stored data to the host device. The host device 300 may be an external device of the memory module 50.

The memory module 50 may a type that is compliant with or compatible with a host interface between the host device 300 and the memory module 50. Examples of the memory module 50 may include an SSD, a multimedia card in a form of an MMC, an eMMC, an RS-MMC, and a micro-MMC, a secure digital card in a form of an SD, a mini-SD, and a micro-SD, a universal serial bus (USB) memory module, a universal flash storage (UFS) device, a personal computer memory card international association (PCMCIA) card type memory module, a peripheral component interconnection (PCI) card type memory module, a PCI express (PCI-E) card type memory module, a compact flash (CF) card, a smart media card, and a memory stick.

The memory module 50 may be implemented as any one of various types of packages. For example, the memory module 50 may be implemented as any one of various types of package types, such as a package on package (POP), a system in package (SIP), a system on chip (SOC), a multi-chip package (MCP), a chip on board (COB), a wafer-level fabricated package (WFP), and a wafer-level stack package (WSP).

The memory device 100 may store data. The memory device 100 operates under control of the memory controller 200. The memory device 100 may include a memory cell array including a plurality of memory cells that store data.

In some implementations, the memory cell array may include a plurality of memory blocks. Each memory block may include a plurality of memory cells. One memory block may include a plurality of pages. In an embodiment, the page may be a unit for storing data in the memory device 100 or reading data stored in the memory device 100.

In some implementations, the memory block may be a minimum unit for erasing data. In an embodiment, the memory device 100 may be a double data rate synchronous dynamic random access memory (DDR SDRAM), a low power double data rate4 (LPDDR4) SDRAM, a graphics double data rate (GDDR) SDRAM, a low power DDR (LPDDR), a Rambus dynamic random access memory (RDRAM), a NAND flash memory, a vertical NAND flash memory, a NOR flash memory, a resistive random access memory (RRAM), a phase-change random access memory (PRAM), a magnetoresistive RAM (MRAM), a ferroelectric RAM (FRAM), a spin transfer torque RAM (STT-RAM), or others.

The memory device 100 is configured to receive a command and an address from the memory controller 200 and access an area selected by the address of the memory cell array. That is, the memory device 100 may perform an operation instructed by the command on the area selected by the address. For example, the memory device 100 may perform a write operation (e.g., program operation), a read operation, and an erase operation. During the program operation, the memory device 100 may write data to the area selected by the address. During the read operation, the memory device 100 may read data from the area selected by the address. During the erase operation, the memory device 100 may erase data stored in the area selected by the address.

The memory controller 200 controls an overall operation of the memory module 50.

In an embodiment, the memory controller 200 may receive data and a logical address from the host device 300. The memory controller 200 may convert the logical address into a physical address indicating a position of memory cells of the memory device 100 in which data is to be stored.

The memory controller 200 may control the memory device 100 to perform a program operation, a read operation, an erase operation, or others according to a request of the host device 300. During the program operation, the memory controller 200 may provide a write command, a physical block address, and data to the memory device 100. During the read operation, the memory controller 200 may provide a read command and the physical block address to the memory device 100. During the erase operation, the memory controller 200 may provide an erase command and the physical block address to the memory device 100.

The host device 300 may communicate with the memory module 50 using a communication method such as a universal serial bus (USB), a serial AT attachment (SATA), a serial attached SCSI (SAS), a high speed interchip (HSIC), a small computer system interface (SCSI), a peripheral component interconnection (PCI), a PCI express (PCIe), a nonvolatile memory express (NVMe), a compute express link (CXL), a universal flash storage (UFS), a secure digital (SD), a multi-media card (MMC), an embedded MMC (eMMC), a dual in-line memory module (DIMM), a registered DIMM (RDIMM), and a load reduced DIMM (LRDIMM).

As shown in FIG. 1, in an embodiment, the host device 300 may communicate with the memory module 50 through a first interface 10. The first interface 10 may include an interface implemented based on a compute express link (CXL) protocol. Compute express link (CXL) is a standard for high-speed, high capacity central processing unit (CPU)-to-device and CPU-to-memory connections. In some implementations, the CXL protocol may use a serial interface. In some implementations, the serial communication capabilities allow memory to overcome performance and packaging limitations of common memory modules when implementing high storage capacities. The first interface 10 may be referred to as a host interface. As shown in FIG. 1, in an embodiment, the memory controller 200 and the memory device 100 may communicate through a second interface 20. The second interface 20 may include an interface implemented based on a dual inline memory module (DIMM) protocol. The second interface 20 may be an example of a memory interface. The first interface 10 may be a serial interface or a parallel interface. Similarly, the second interface 20 may be a serial interface or a parallel interface.

In an embodiment, the memory controller 200 may set the second interface 20 (e.g., a type of the second interface 20) as the parallel interface or the serial interface according to a ratio between a first request and a second request received from the host device 300. In an embodiment, the first request may be a read request and the second request may be a write request. In another embodiment, the first request may be a write request and the second request may be a read request.

The memory controller 200 may receive at least one first request and at least one second request from the host device 300. The memory controller 200 may calculate the ratio between the first request and the second request based on the number of first requests and the number of second requests received from the host device 300. In another embodiment, the memory controller 200 may calculate the ratio between the first request and the second request based on an amount of data corresponding to the first request and an amount of data corresponding to the second request.

Figure 2:
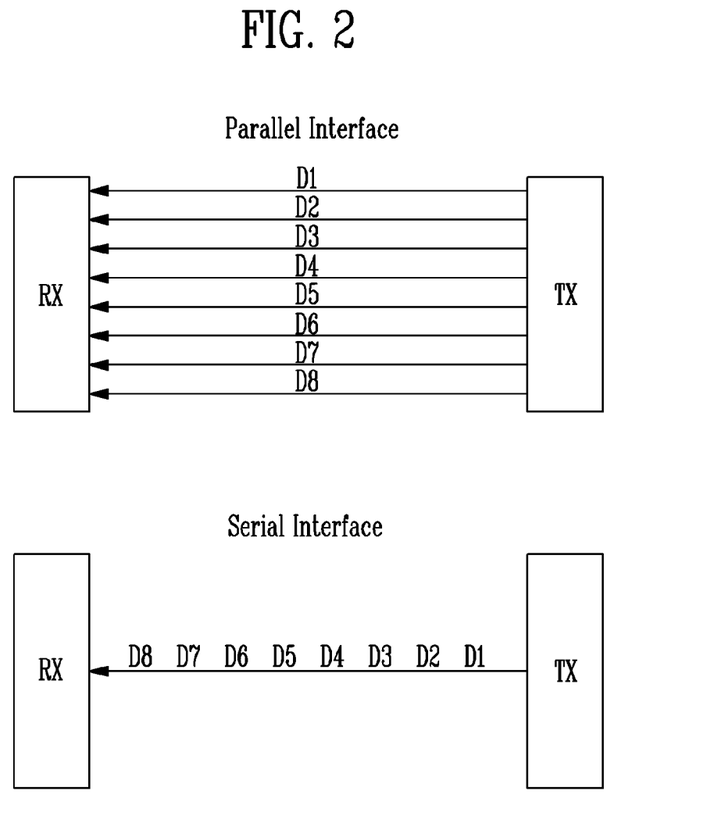
FIG. 2 is a diagram illustrating an example of a parallel interface and an example of a serial interface based on some embodiments of the disclosed technology.

FIG. 2 is a diagram illustrating an example of the parallel interface and an example of the serial interface based on some embodiments of the disclosed technology.

Referring to FIG. 2, in the parallel interface, a transmitter TX may simultaneously transmit a plurality of data bits to a receiver RX through a plurality of data lines. For example, the transmitter TX may simultaneously transmit first to eighth data bits D1 to D8 to the receiver RX through eight data lines. In one example, the data line indicates an electrical line or circuit that carries data.

In the serial interface, the transmitter TX may successively transmit one data bit at a time to the receiver RX. For example, the transmitter TX may successively transmit first to eighth data bits D1 to D8 to the receiver RX through one data line.

Figure 3:
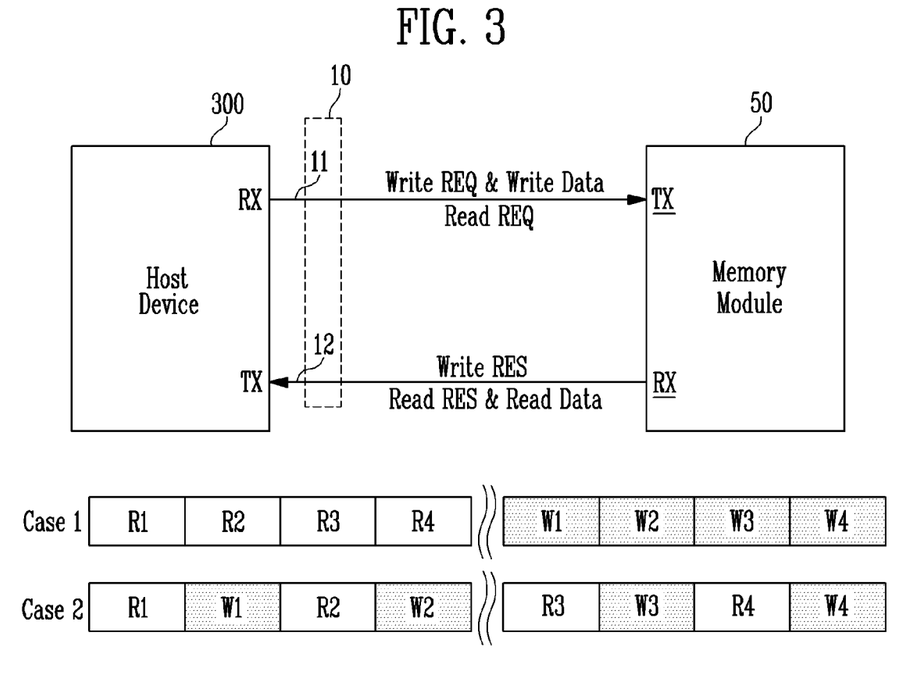
FIG. 3 is a diagram illustrating an example of an interface and how a bottleneck can affect the operations between the host device and the memory module.

FIG. 3 is a diagram illustrating an example of an interface and how a bottleneck can affect the operations between the host device and the memory module.

Referring to FIG. 3, the host device 300 and the memory module 50 may communicate through the first interface 10. In some implementations, the first interface 10 may be the host interface and may be set as the serial interface. In other implementations, the first interface 10 may be set as the parallel interface.

The first interface 10 may include a transmission line 11 that carries data or other signals from the host device 300 to the memory module 50 and a reception line 12 that carries data or other signals from the memory module 50 to the host device 300.

The host device 300 may transmit a write request and write data to the memory module 50 through the transmission line 11. The host device 300 may receive a write response from the memory module 50 through the reception line 12. In one example, the write response may indicate the data has been written to the memory module 50 as requested by the write request.

The host device 300 may transmit a read request to the memory module 50 through the transmission line 11. The host device 300 may receive a read response and read data from the memory module 50 through the reception line 12.

Of the data bits transmitted between the host device 300 and the memory module 50, data bits corresponding to the write data is larger than data bits corresponding to the read data, or data bits corresponding to the read data is larger than data bits corresponding to the write data. Therefore, the transmission line 11 may cause a bottleneck when it carries the write data together with the write request, and the reception line 12 may cause a bottleneck when it carries the read data together with the read response.

In a first case, the host device 300 may successively transmit read requests R1 to R4 to the memory module 50, and after the read requests R1 to R4 are processed, write requests W1 to W4 may be successively transmitted to the memory module 50.

When the read requests R1 to R4 are continuous, the transmission line 11 may carry the read requests R1 to R4 to the memory module 50 without a bottleneck. However, the reception line 12 may cause a bottleneck because it is required to successively carry the read responses and read data corresponding to the read requests R1 to R4 to the host device 300.

When the write requests W1 to W4 are continuous, the transmission line 11 may cause a bottleneck because it is required to successively carry the write data corresponding to the write requests W1 to W4. In contrast, the reception line 12 may carry the write response without causing a bottleneck.

In other words, when the first interface 10 is the serial interface, the transmission line 11 or the reception line 12 may cause a bottleneck in a case where the read request is continuous or the write request is continuous, and thus data transmission efficiency may be reduced.

In a second case, the read requests R1 to R4 and the write requests W1 to W4 are uniformly distributed by alternately activating the transmission line 11 and the reception line 12, thereby reducing or minimizing the bottleneck.

In FIG. 3, a ratio of the read request or the write request may be a ratio of the read request or the write request in all requests received during a specific time. For example, when receiving the first four requests, in the first case the first four requests are four read requests, and in the second case two of the first four requests are read requests and two of the first four requests are write requests. Therefore, in the first case, a ratio of the read request to the write operation is 100% and a ratio of the write request to the read request is 0%, but in the second case, both the ratio of the read request to the write operation and the ratio of the write request to the read request are 50%. When receiving next four requests, in the first case the four requests are four write requests, and in the second case two of the four requests are read requests and two of the four requests are write requests. In the first case, the ratio of the write request to the read request is 100% and the ratio of the read request to the write request is 0%, but in the second case, both the ratio of the read request to the write operation and the ratio of the write request to the read request are 50%.

Therefore, the serial interface can improve the efficiency when the number of the read request and the number of the write request are close, whereas its efficiency may be decreased when the read request and the write request are not evenly distributed.

Figure 4:
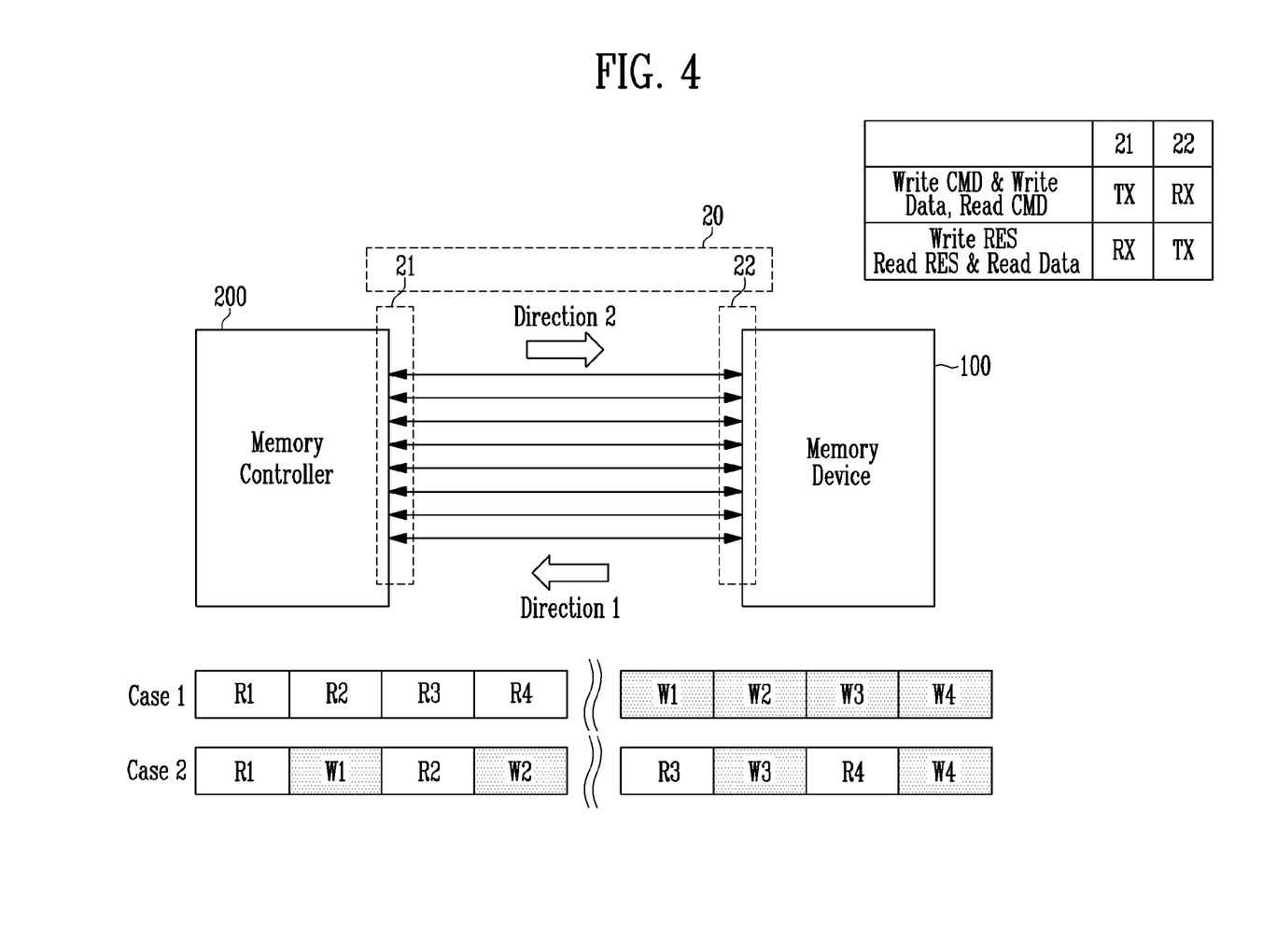
FIG. 4 is a diagram illustrating an example of an interface and how a bottleneck can affect the operations between a memory controller and a memory device.

FIG. 4 is a diagram illustrating an example of an interface and how a bottleneck can affect the operations between the memory controller and the memory device.

Referring to FIG. 4, the memory controller 200 and the memory device 100 may communicate with each other through the second interface 20. In some implementations, the second interface 20 may be the memory interface and may be set as the parallel interface. In other implementations, the second interface 20 may be set as the serial interface.

The second interface 20 may include a plurality of data lines and may be divided into first data lines 21 coupled to the memory controller 200 and second data lines 22 coupled to the memory device 100.

When the memory controller 200 transmits the write command and the write data or transmits the read command to the memory device 100, the first data lines 21 may be used as the transmitter TX and the second data lines may be used as the receiver RX.

When the memory controller 200 receives the write response or receives the read response and the read data from the memory device 100, the first data lines 21 may be used as the receiver RX and the second data lines 22 may be used as the transmitter TX.

In the first case, the memory controller 200 may successively transmit the read commands corresponding to the read requests R1 to R4 to the memory device 100, and then successively transmit the write commands corresponding to the write requests W1 to W4 to the memory device 100.

When the read requests R1 to R4 are continuous, a main flow of data may be a first direction from the memory device 100 to the memory controller 200, which is a reception direction of the read data. When the write requests W1 to W4 are continuous, a main flow of data may be a second direction from the memory controller 200 to the memory device 100, which is a transmission direction of the write data.

When the read requests R1 to R4 and the write requests W1 to W4 are uniformly distributed as in the second case, the first direction when processing the read request and the second direction when processing the write request are required to be switched continuously. In other words, since an operation mode of the first data lines 21 and the second data lines 22 is switched whenever a data transmission direction is switched, a delay may occur. Therefore, when the read request and the write request are uniformly distributed, the data transmission efficiency may be decreased due to a delay resulting from an operation mode change.

Therefore, in a case of the parallel interface, the efficiency may be increased when one of the read request and the write request is continuous, and the efficiency may be decreased when the number of the read request and the number of the write request are similar and the read request and the write request are evenly distributed.

Different from the case of the serial interface described with reference to FIG. 3, when the number of read request and the number of the write request are similar, the serial interface may be advantageous for data transmission, and when there is much difference between the ratio of the read request and the ratio of the write request, the parallel interface may be advantageous for data transmission.

Figure 5:
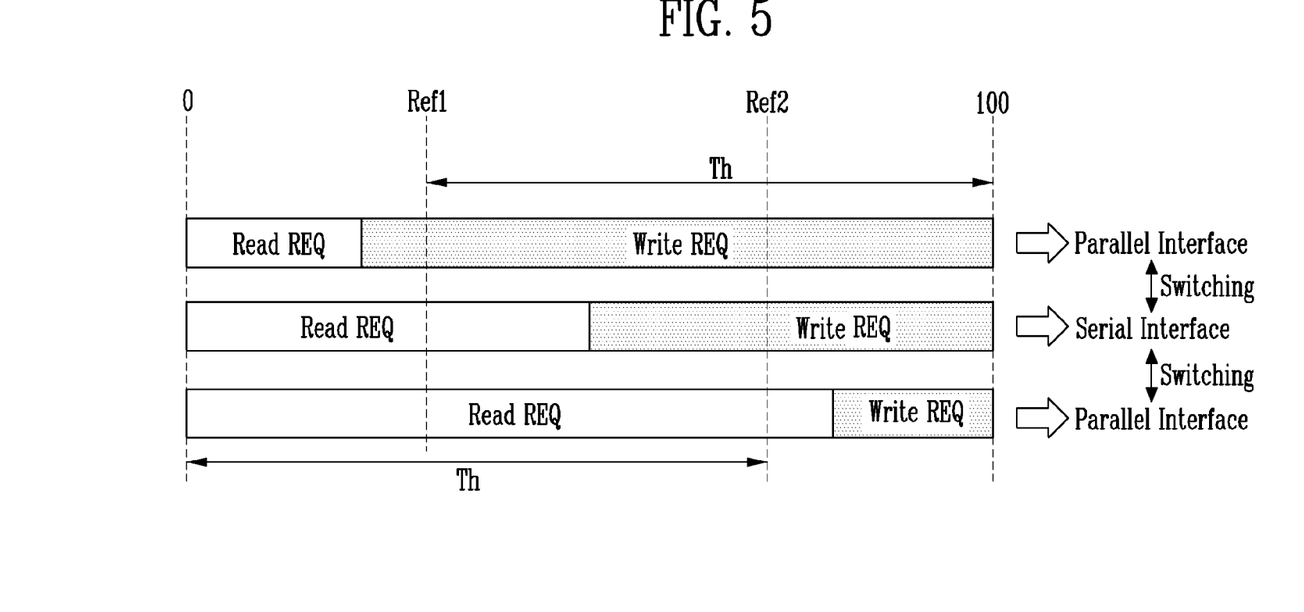
FIG. 5 is a diagram illustrating an example operation of setting a type of a memory interface based on some embodiments of the disclosed technology.

FIG. 5 is a diagram illustrating an example operation of setting a type of a memory interface based on some embodiments of the disclosed technology.

Referring to FIG. 5, the memory controller may set the memory interface as the parallel interface or the serial interface according to the ratio between the first request and the second request received from the host device, thereby improving data transmission efficiency by dynamically setting the memory interface (e.g., the second interface) according to the ratio between the first request and the second request received from the host device by the memory controller when it is assumed that the first interface (e.g., the host interface) described with reference to FIG. 3 is the serial interface.

In FIG. 5, the first request may be the read request and the second request may be the write request. In another embodiment, the first request may be the write request and the second request may be the read request.

In an embodiment, the memory controller may set the memory interface as the parallel interface when the ratio of the first request to the second request or the ratio of the second request to the first request is greater than or equal to a threshold ratio Th. The memory controller may set the memory interface as the serial interface when the ratio of the first request to the second request and the ratio of the second request to the first request are less than the threshold ratio Th.

In an embodiment, the memory controller may set the memory interface as the serial interface when the ratio of the first request to the second request is greater than a first reference ratio Ref1 and less than a second reference ratio Ref2. The memory controller may set the memory interface as the parallel interface when the ratio of the first request to the second request is less than or equal to the first reference ratio Ref1. The memory controller may set the memory interface as the parallel interface when the ratio of the first request to the second request is greater than or equal to the second reference ratio Ref2.

In other words, the memory controller may set the memory interface as the parallel interface as a default as described with reference to FIG. 4, but may set the memory interface as the serial interface according to the ratio of the first request to the second request and the ratio of the second request to the first request received from the host device. Specifically, the memory controller may set the memory interface as the parallel interface when there is much difference between the number of the first request and the number of the second request, and may set the memory interface as the serial interface when the ratio of the first request and the ratio of the second request are evenly distributed.

Accordingly, the memory controller may improve data transmission efficiency by setting the memory interface as the serial interface, like the host interface.

Figure 6:
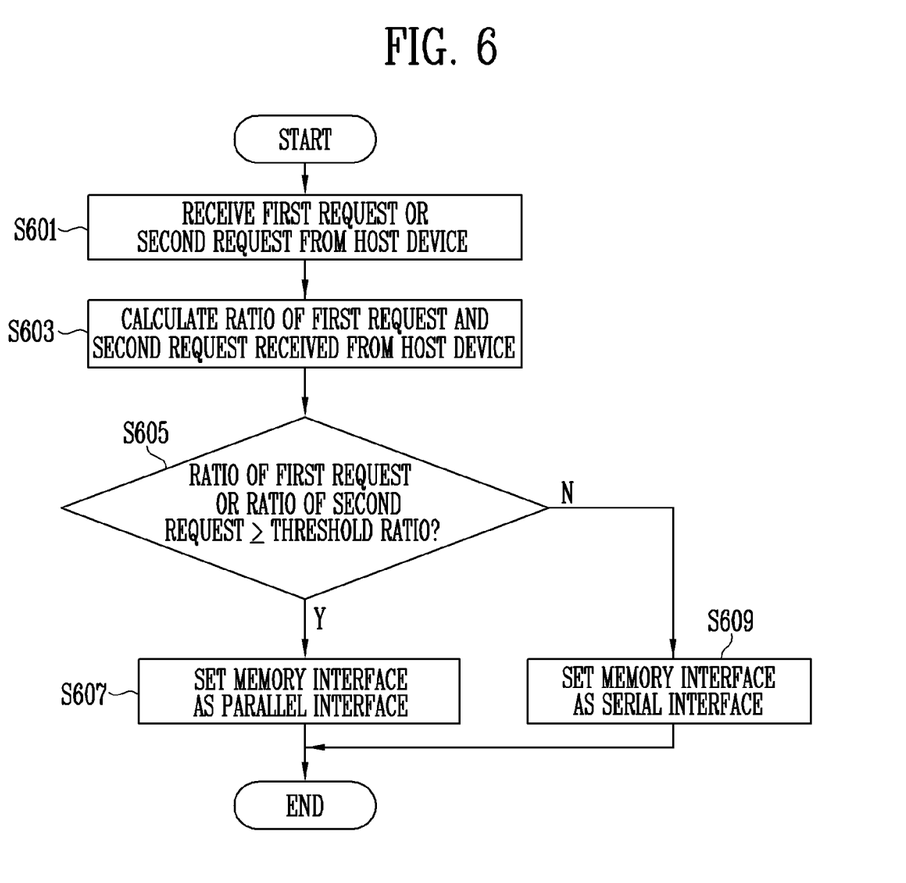
FIG. 6 is a flowchart illustrating an example operation of a memory module based on some embodiments of the disclosed technology.

FIG. 6 is a flowchart illustrating an example operation of a memory module based on some embodiments of the disclosed technology.

Referring to FIG. 6, at S601, the memory module may receive the first request or the second request from the host device. The first request may be the read request and the second request may be the write request. In another embodiment, the first request may be the write request and the second request may be the read request.

At S603, the memory module may calculate the ratio of the first request and the second request received from the host device.

At S605, the memory module may determine whether the ratio of the first request or the ratio of the second request is greater than or equal to the threshold ratio. As a result of the determination, when the ratio of the first request or the ratio of the second request is greater than or equal to the threshold ratio, the operation proceeds to step S607, and when the ratio of the first request and the ratio of the second request are less than the threshold ratio, the operation proceeds to step S609.

At S607, the memory module may set the memory interface as the parallel interface.

At S609, the memory module may set the memory interface as the serial interface.

Figure 7:
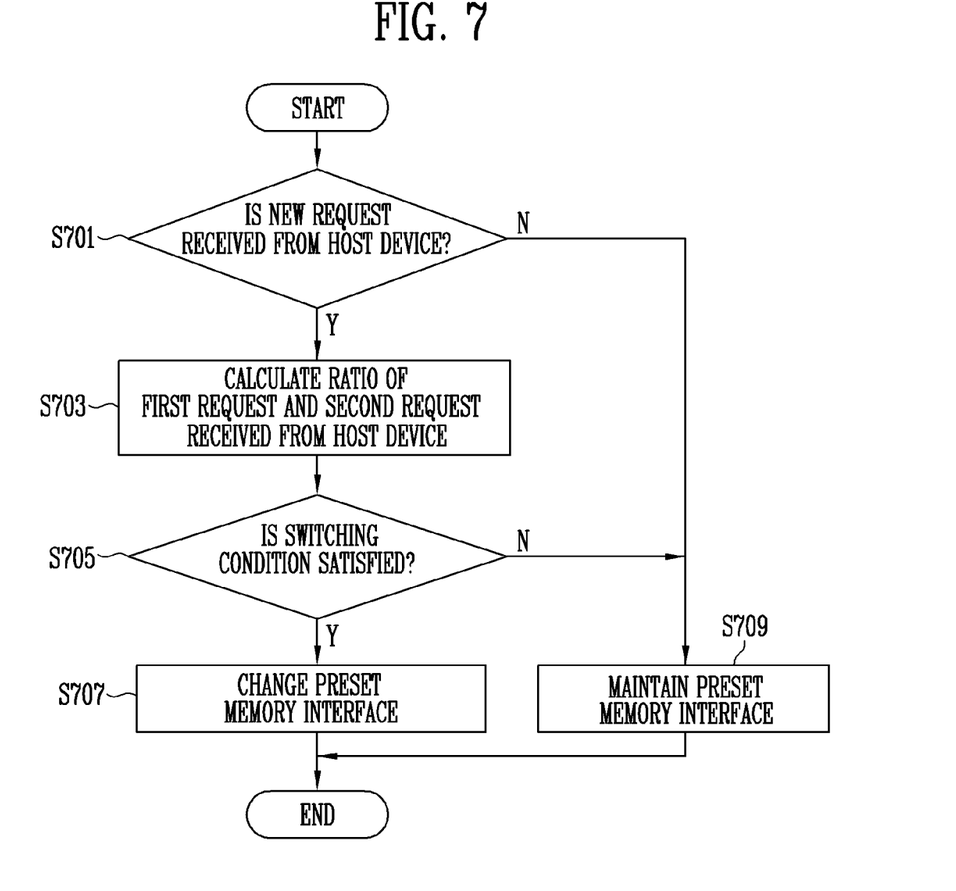
FIG. 7 is a flowchart illustrating an example operation of a memory module based on some embodiments of the disclosed technology.

FIG. 7 is a flowchart illustrating an example operation of a memory module based on some embodiments of the disclosed technology.

Referring to FIG. 7, at S701, the memory module may determine whether a new request is received from the host device. As a result of the determination, when the new request is received, the operation proceeds to step S703, and when the new request is not received, the operation proceeds to step S709.

At S703, the memory module may calculate the ratio of the first request and the second request received from the host device.

At S705, the memory module may determine whether a switching condition is satisfied. When the switching condition is satisfied, the operation proceeds to step S707, and when the switching condition is not satisfied, the operation proceeds to step S709. Whether the switching condition is satisfied or not is described with reference to FIG. 8.

At S707, the memory module may change a preset memory interface. For example, when the preset memory interface is the parallel interface, the memory module may change the memory interface to the serial interface. When the preset memory interface is the serial interface, the memory module may change the memory interface to the parallel interface.

At S709, the memory module may maintain the preset memory interface.

Figure 8:
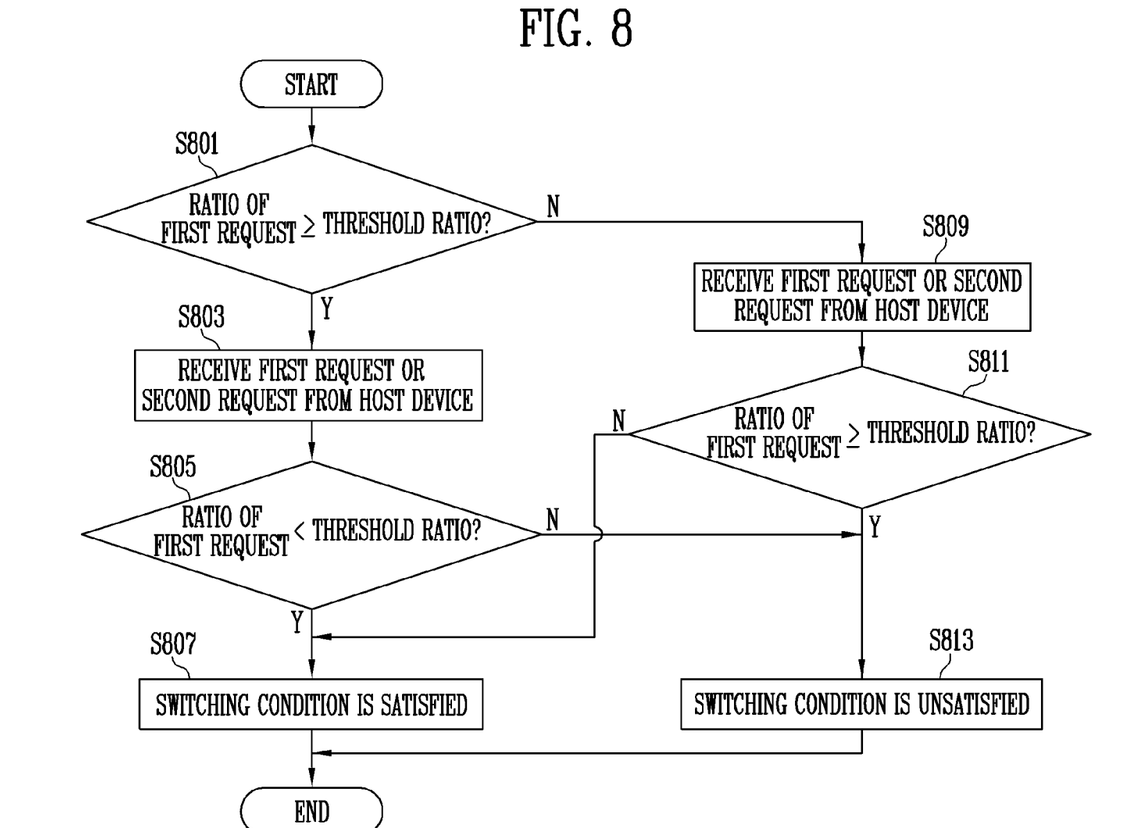
FIG. 8 is a flowchart illustrating an example operation of a memory module based on some embodiments of the disclosed technology.

FIG. 8 is a flowchart illustrating an example operation of a memory module based on some embodiments of the disclosed technology.

Referring to FIG. 8, at S801, the memory module may determine whether the ratio of the first request is greater than or equal to the threshold ratio. As a result of the determination, when the ratio of the first request is greater than or equal to the threshold ratio, the operation proceeds to step S803, and when the ratio of the first request is less than the threshold ratio, the operation proceeds to step S809. The first request may be the read request and the second request may be the write request. In another embodiment, the first request may be the write request and the second request may be the read request.

At S803, the memory module may receive the first request or the second request from the host device.

At S805, the memory module may determine whether the ratio of the first request is less than the threshold ratio. As a result of the determination, when the ratio of the first request is less than the threshold ratio, the operation proceeds to step S807, and when the ratio of the first request is greater than or equal to the threshold ratio, the operation proceeds to step S813.

At S807, the memory module may determine that the switching condition is satisfied.

At S809, the memory module may receive the first request or the second request from the host device.

At S811, the memory module may determine whether the ratio of the first request is greater than or equal to the threshold ratio. As a result of the determination, when the ratio of the first request is greater than or equal to the threshold ratio, the operation proceeds to step S813, and when the ratio of the first request is less than the threshold ratio, the operation proceeds to step S807.

At S813, the memory module may determine that the switching condition is unsatisfied.

Figure 9:
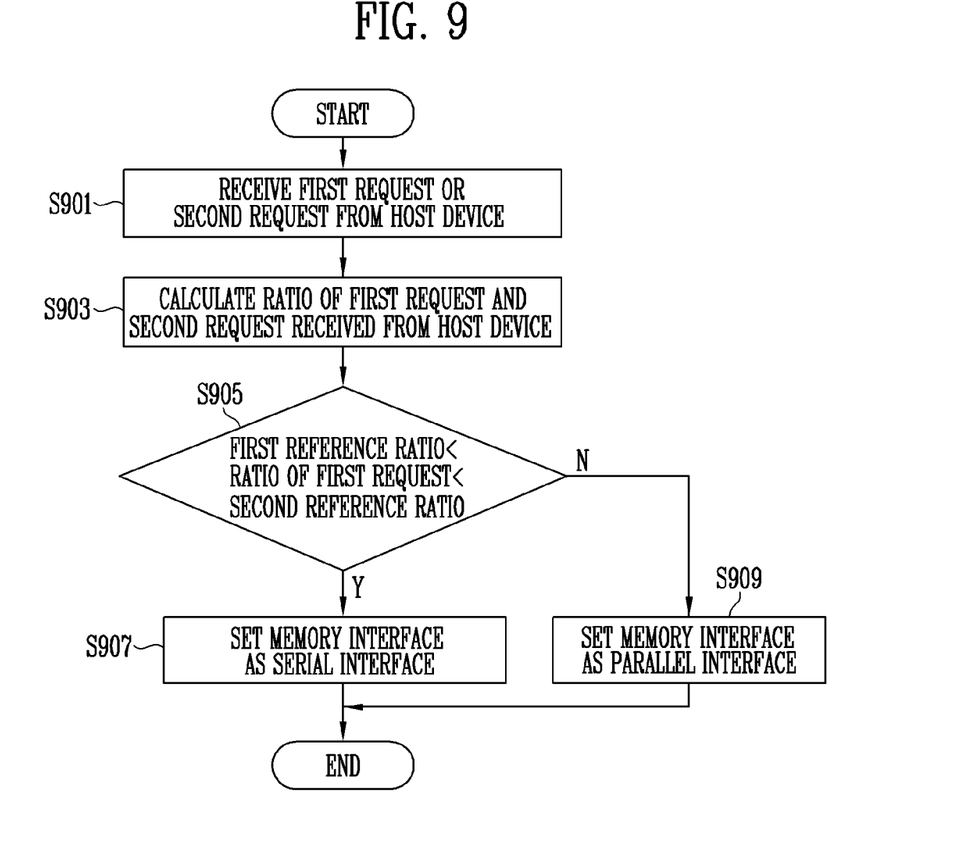
FIG. 9 is a flowchart illustrating an example operation of a memory module based on some embodiments of the disclosed technology.

FIG. 9 is a flowchart illustrating an example operation of a memory module based on some embodiments of the disclosed technology.

Referring to FIG. 9, at S901, the memory module may receive the first request or the second request from the host device.

At S903, the memory module may calculate the ratio of the first request and the second request received from the host device.

At S905, the memory module may determine whether the ratio of the first request is greater than the first reference ratio and less than the second reference ratio. As a result of the determination, when the ratio of the first request is greater than the first reference ratio and less than the second reference ratio, the operation proceeds to step S907, and when the ratio of the first request is less than or equal to the first reference ratio or greater than or equal to the second reference ratio, the operation proceeds to step S909.

At S907, the memory module may set the memory interface as the serial interface.

At S909, the memory module may set the memory interface as the parallel interface.

Figure 10:
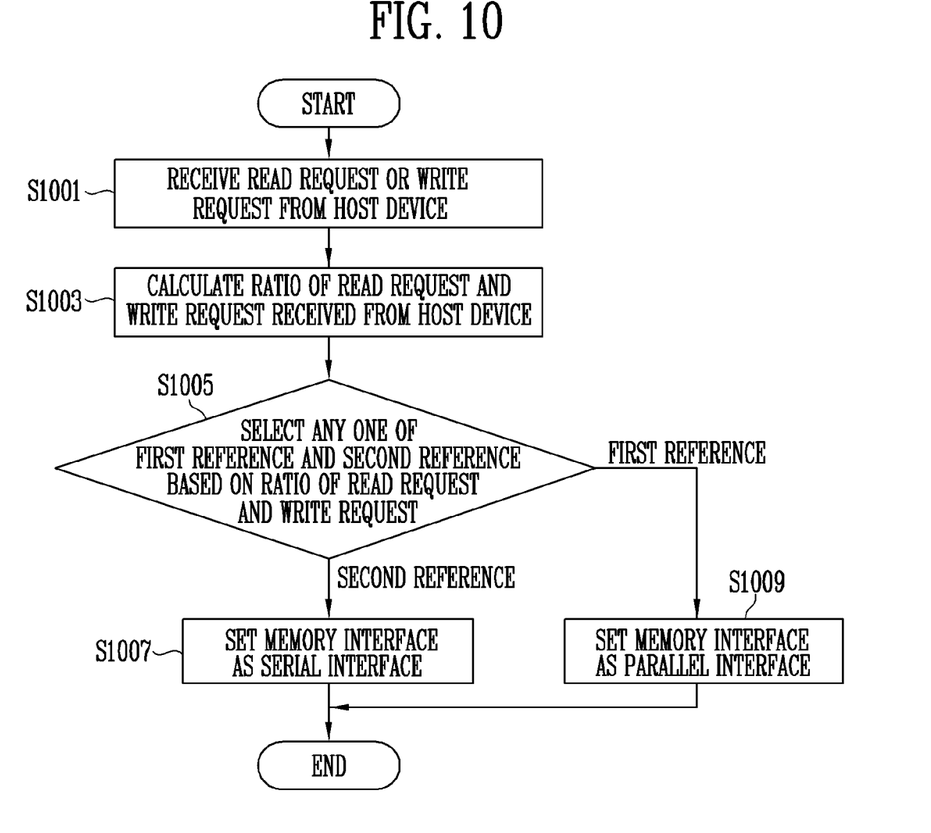
FIG. 10 is a flowchart illustrating an example operation of a memory module based on some embodiments of the disclosed technology.

FIG. 10 is a flowchart illustrating an example operation of a memory module based on some embodiments of the disclosed technology.

Referring to FIG. 10, at S1001, the memory module may receive the read request or the write request from the host device.

At S1003, the memory module may calculate the ratio of the read request and the write request received from the host device. For example, the memory module may calculate the ratio of the read request and the write request based on the number of each request or the amount of data corresponding to each request.

At S1005, the memory module may select any one of a first reference (first condition) and a second reference (second condition) based on the ratio of the read request and the write request. When the first condition is selected, the operation may proceed to step S1009, and when the second condition is selected, the operation may proceed to step S1007.

For example, the memory module may select the first condition when the ratio of the read request or the ratio of the write request is greater than or equal to the threshold ratio. The memory module may select the second condition when the ratio of the read request and the ratio of the write request are less than the threshold ratio.

As another example, the memory module may select the first condition when the ratio of the read request is greater than the first reference ratio and less than the second reference ratio. The memory module may select the second condition when the ratio of the read request is less than or equal to the first reference ratio or greater than or equal to the second reference ratio.

At S1007, the memory module may set the memory interface as the serial interface.

At S1009, the memory module may set the memory interface as the parallel interface.

While this patent document contains many specifics, these should not be construed as limitations on the scope of any disclosed technology or of what may be claimed, but rather as descriptions of features that may be specific to particular embodiments of particular disclosed technology. Certain features that are described in this patent document in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described in this patent document should not be understood as requiring such separation in all embodiments.

The embodiments and implementations disclosed above are examples only; various enhancements and variations to the disclosed embodiments and implementations and other embodiments and implementations can be made based on what is described and illustrated in this patent document.

What is claimed is:

1. A memory module comprising:
a memory device that stores data; and
a memory controller configured to:
communicate with an external device through a first interface and with the memory device through a second interface, wherein the memory controller is further configured to:
receive, through the first interface, a first request and a second request from the external device;
calculate ratios of the first request and the second request; and
set a type of the second interface as a parallel interface or a serial interface according to the ratios,
wherein the memory controller sets the type of the second interface as the serial interface upon determination that the ratio of the first request and the ratio of the second request are less than a threshold ratio.

2. The memory module of claim 1, wherein the memory controller sets the type of the second interface as the parallel interface upon determination that the ratio of the first request or the ratio of the second request is greater than or equal to a threshold ratio.

3. The memory module of claim 1, wherein the memory controller sets the type of the second interface as the serial interface upon determination that the ratio of the first request is greater than a first reference ratio and less than a second reference ratio, wherein the first reference ratio has a smaller value than the second reference ratio.

4. The memory module of claim 1, wherein the memory controller sets the type of the second interface as the parallel interface upon determination that the ratio of the first request is less than or equal to a first reference ratio or greater than or equal to a second reference ratio, wherein the first reference ratio has a smaller value than the second reference ratio.

5. The memory module of claim 1, wherein the memory controller calculates the ratio between the first request and the second request based on: a number of the first request and a number of the second request; or an amount of data corresponding to the first request and an amount of data corresponding to the second request.

6. The memory module of claim 1, wherein the first interface includes an interface implemented based on a compute express link (CXL) protocol, and
the second interface includes an interface implemented based on a dual inline memory module (DIMM) protocol.

7. The memory module of claim 1, wherein the first request is a read request and the second request is a write request, or
wherein the first request is a write request and the second request is a read request.

8. A method of operating a memory module communicating with an external device through a first interface, the method comprising:
receiving, through the first interface, a first request and a second request from the external device;
calculating ratios of the first request and the second request; and
setting a type of a memory interface configured to interface a memory device with a memory controller in the memory module as a parallel interface or a serial interface according to the ratios,
wherein the type of the memory interface is set as the serial interface upon determination that the ratio of the first request and the ratio of the second request are less than a threshold ratio.

9. The method of claim 8, wherein the type of the memory interface is set as the parallel interface upon determination that the ratio of the first request or the ratio of the second request is greater than or equal to a threshold ratio.

10. The method of claim 8, wherein the type of the memory interface is set as the serial interface upon determination that the ratio of the first request is greater than a first reference ratio and less than a second reference ratio, wherein the first reference ratio has a smaller value than the second reference ratio.

11. The method of claim 8, wherein the type of the memory interface is set as the parallel interface upon determination that the ratio of the first request is less than or equal to a first reference ratio or greater than or equal to a second reference ratio, wherein the first reference ratio has a smaller value than the second reference ratio.

12. The method of claim 11, wherein the memory interface includes an interface implemented based on a dual inline memory module (DIMM) protocol and is different from a host interface that communicates with the external device, and
wherein the host interface includes an interface implemented based on a compute express link (CXL) protocol.

13. The method of claim 8, wherein the ratio between the first request and the second request is determined based on: a number of the first request and a number of the second request; or an amount of data corresponding to the first request and an amount of data corresponding to the second request.

14. The method of claim 8, wherein the first request is a read request and the second request is a write request, or
   wherein the first request is a write request and the second request is a read request.

15. A method of operating a memory module communicating with an external device through a first interface, the method comprising:
   receiving, through the first interface, a read request and a write request from the external device;
   calculating ratios of the read request and the write request;
   selecting one of a first condition and a second condition based on the ratios;
   setting a type of a memory interface configured to interface a memory device with a memory controller in the memory module as a parallel interface upon selecting the first condition; and
   setting the type of the memory interface as a serial interface upon selecting the second condition,
   wherein the second condition is selected upon determination that the ratio of the read request and the ratio of the write request are less than a threshold ratio.

16. The method of claim 15, wherein the first condition is selected upon determination that the ratio of the read request or the ratio of the write request is greater than or equal to a threshold ratio.

17. The method of claim 15, wherein the second condition is selected upon determination that the ratio of the read request is greater than a first reference ratio and less than a second reference ratio, wherein the first reference ratio has a smaller value than the second reference ratio.

18. The method of claim 15, wherein the first condition is selected upon determination that the ratio of the read request is less than or equal to a first reference ratio or greater than or equal to a second reference ratio, wherein the first reference ratio has a smaller value than the second reference ratio.

19. The method of claim 15, wherein the memory interface includes an interface implemented based on a dual inline memory module (DIMM) protocol and is different from a host interface that communicates with the external device, and
   wherein the host interface includes an interface implemented based on a compute express link (CXL) protocol.

\* \* \* \* \*